US007774762B2

(12) United States Patent
Rochette et al.

(10) Patent No.: US 7,774,762 B2
(45) Date of Patent: Aug. 10, 2010

(54) SYSTEM INCLUDING RUN-TIME SOFTWARE TO ENABLE A SOFTWARE APPLICATION TO EXECUTE ON AN INCOMPATIBLE COMPUTER PLATFORM

(75) Inventors: Donn Rochette, Fenton, IA (US); Alois Liebl, New York, NY (US); Craig MacDonald, Kanata (CA)

(73) Assignee: Trigence Corp., Ottawa, Ontario (CA)

( * ) Notice: Subject to any disclaimer, the term of this patent is extended or adjusted under 35 U.S.C. 154(b) by 1124 days.

(21) Appl. No.: 11/380,285

(22) Filed: Apr. 26, 2006

(65) Prior Publication Data
US 2006/0184931 A1  Aug. 17, 2006

Related U.S. Application Data

(63) Continuation-in-part of application No. 10/946,536, filed on Sep. 21, 2004, and a continuation-in-part of application No. 10/939,903, filed on Sep. 13, 2004, now Pat. No. 7,519,814.

(60) Provisional application No. 60/676,998, filed on May 2, 2005, provisional application No. 60/504,213, filed on Sep. 22, 2003, provisional application No. 60/502,619, filed on Sep. 15, 2003, provisional application No. 60/512,103, filed on Oct. 20, 2003.

(51) Int. Cl.
G06F 9/455 (2006.01)
(52) U.S. Cl. .................................... 717/138
(58) Field of Classification Search ............. 717/138
See application file for complete search history.

(56) References Cited

U.S. PATENT DOCUMENTS

| 2002/0004854 | A1 | 1/2002 | Hartley |
| 2002/0133529 | A1* | 9/2002 | Schmidt ............... 709/102 |
| 2002/0174215 | A1 | 11/2002 | Schaefer ............... 709/224 |
| 2003/0101292 | A1 | 5/2003 | Fisher |

FOREIGN PATENT DOCUMENTS

| WO | WO 02/06941 A | 1/2002 |
| WO | WO 2006/039181 A | 4/2006 |

* cited by examiner

Primary Examiner—Li B Zhen
Assistant Examiner—Syed Roni
(74) Attorney, Agent, or Firm—Allen, Dyer, Doppelt, Milbrath & Gilchrist, P.A.

(57) ABSTRACT

This invention discloses a system for enabling a first software application, which is designed for execution on a first computer platform, to be executed on an incompatible computer platform in which the software application is not intended to execute. A first group of files that are distributed with or are specific to the first software application intended to run on the first computer platform are preferably isolated from other software applications by way of being capsule or encapsulated so as to provide an isolated first group of files; capsule runtime software manages a dynamic state and file location of the isolated first group of files and includes capsule runtime software including a kernel module and application libraries for modifying the behavior of the local operating system residing on the incompatible computer platform, so that execution of the first software application requires access of the isolated first group of files in place of operating system files and providing capsule specific values instead of values related to the identity of the incompatible computer platform.

20 Claims, 14 Drawing Sheets

SYSTEM INCLUDING RUN-TIME SOFTWARE TO ENABLE A SOFTWARE APPLICATION TO EXECUTE ON AN INCOMPATIBLE COMPUTER PLATFORM

CROSS-REFERENCE TO RELATED APPLICATIONS

This application claims priority of U.S. Provisional Patent Application No. 60/676,998 filed May 2, 2005, and is a continuation in part application of U.S. patent application Ser. No. 10/946,536, filed Sep. 21, 2004, entitled "Computing System having User Mode Critical System Elements as Shared Libraries" which claims priority from U.S. Provisional Patent Application No. 60/504,213 filed Sep. 22, 2003, entitled "User Mode Critical System Element as Shared Libs". This application is also a continuation in part of U.S. patent application Ser. No. 10/939,903, filed Sep. 13, 2004, now U.S. Pat. No. 7,519,814 entitled "System for Containerization of Application Sets" which claims priority from U.S. Provisional Patent Application No. 60/502,619 filed Sep. 15, 2003, and 60/512,103 filed Oct. 20, 2003, which are all incorporated herein by reference for all purposes.

FIELD OF THE INVENTION

The invention relates to computer software, and in particular, the invention relates to management and deployment of one or more software applications on one or more computer platforms for which one or more applications was not designed to execute on.

BACKGROUND OF THE INVENTION

Computer systems are designed in such a way that application programs share common resources. It is traditionally the task of an operating system to provide a mechanism to safely and effectively control access to shared resources required by application programs. This is the foundation of multi-tasking systems that allow multiple disparate applications to co-exist on a single computer system.

Furthermore, computer software applications are typically designed to run on a specific computer platform, and will not run on one it is not designed for. Therefore programmers desirous of their software to be used on a plurality of different incompatible computer platforms, have to design specific versions of their software that are compatible with each specific computer platform and operating system it is to be installed on.

It is an object of this invention to provide a system whereby one or more software applications can be run or executed on an incompatible computer platform which heretofore, the applications could not be run on. This provides a significant advantage. It allows a single application that was only executable on a specific computer platform to now be used by a plurality of different computer platforms. Special software applications need not be written, taking weeks, months or years to create and deploy; now in accordance with this invention, by providing linkages to libraries and applications, and providing a secure capsule run time environment, software applications can be run on systems where they could not before.

It is an object of this invention to provide a system which offers compatibility between some software applications and compute platforms that are not otherwise compatible.

SUMMARY OF THE INVENTION

In accordance with the invention there is provided, a system for enabling a first software application, which is designed for execution on a first computer platform, to be executed on an incompatible computer platform in which the first software application is not intended to execute, said system for providing a secure substantially isolated capsule environment for execution of the first software application on the incompatible computer platform, said first software application including an object executable by a local operating system of the incompatible computer platform for performing a task related to a service, the incompatible computer platform including a processor, an operating system including a local kernel residing on the incompatible computer platform, and a set of associated local system files compatible with the local kernel and the processor of the incompatible computer platform, the system comprising:

a) a set of associated capsule-related files, comprising a first group of files that include the first software application, designed to execute on the first computer platform and a second group of files that are distributed with or are specific to an operating system required to execute the first software application, wherein in operation said associated capsule-related system files are used in place of the associated local system files normally used to perform the same task, which are resident on the incompatible computer platform as part of the operating system, said set of associated capsule-related system files for use by the first software application within the capsule environment; and, b) capsule runtime software for managing a dynamic state and file location of the first software application, the capsule runtime software including a kernel module and at least one application library for filtering system service requests made by the first software application and for providing values from the at least one application library to modify values that otherwise would have been returned by the local operating system in the absence of said filtering a system service request from the first software application, wherein execution of the first software application requires access of files from the capsule-related files in place of operating system files and wherein capsule specific values are provided instead of values related to the identity of the incompatible computer platform.

By way of example, the system in accordance with this invention is capable of allowing an application designed to work with Solaris version 2.6 to be placed into a capsule on a Solaris 9 platform so that it can function within the Solaris 9 platform. Alternatively an application designed for execution with Solaris version 8 is placed in a capsule on a Solaris 9 platform; alternatively a system designed to work with Red Hat Enterprise Linux 4 (EL4) is placed in a capsule on a Suse Linux Enterprise Server 9 (SLES 9) or vice versa; alternatively, an application designed to work with Red Hat Enterprise Linux 3 (EL3) is placed in a capsule on a Suse Linux Enterprise Server 9 (SLES 9) or vice versa; or alternatively an application designed to work with Linux Fedora Core 4 is placed in a capsule on a platform using Suse Pro 9 or vice versa In a broad aspect of the invention a system is provided enabling a first software application, which is designed for execution on a first computer platform, to be executed on an incompatible computer platform in which the software application is not intended to execute, said system comprising:

a first group of files that are distributed with or are specific to the first software application and a second group of files that are distributed with or are specific to the an operating system associated with the first computer platform;

means for isolating the first group of files within a capsule, from other software applications so as to provide an isolated first group of capsule files inaccessible to the other software applications external to the capsule; and, capsule runtime software for managing a dynamic state and file location of the isolated first group of files, the capsule runtime software including a kernel module and at least one application library for modifying the behaviour of a local operating system residing on the incompatible computer platform, so that execution of the first software application requires access of at least some of the isolated first group of files in place of operating system files and providing capsule specific values instead of values related to the identity of the incompatible computer platform.

In accordance with another aspect of the invention, in a system having a computer platform having an operating system for executing a compatible software application including a kernel, a method is provided for executing an incompatible software application, comprising the steps of:

providing to the computer platform for execution by the computer platform one or more encapsulated files, including the incompatible software application and runtime software for filtering requests to the kernel from the incompatible software application and or associated library files, that would otherwise result in a malfunction of the incompatible software application and providing information from files within the encapsulated files so as redirect execution to files within the capsule that allow the incompatible software application to successfully execute.

In accordance with a broad aspect of the invention a system is provided, for enabling a first software application, which is designed for execution on a first computer platform, to be executed on an incompatible computer platform in which the first software application is not intended to execute, said first software application including an object executable by a local operating system of the incompatible computer platform for performing a task related to a service, the incompatible computer platform including a processor, an operating system including a local kernel residing on the incompatible computer platform, and a set of associated local system files compatible with the local kernel and the processor of the incompatible computer platform, the system comprising:

a) a set of first files, comprising a first group of files that include the first software application, designed to execute on the first computer platform and a second group of files that are distributed with or are specific to an operating system required to execute the first software application, wherein in operation said second group of files are used in place of the associated local system files normally used to perform the same task, which are resident on the incompatible computer platform as part of the operating system, said second group of files for use by the first software application; and, b) runtime software for managing a dynamic state and file location of the first software application, the runtime software including a kernel module resident in kernel mode and at least one application filter library resident in user mode for filtering one or more system service requests made by the first software application and for providing values from the at least one application filter library which is provided in addition to the local operating system libraries to modify values that otherwise would have been returned by the local operating system in the absence of said filtering one or more system service requests from the first software application, wherein execution of the first software application requires access of files from first set of files in place of operating system files and wherein predetermined values are provided instead of values related to the identity of the incompatible computer platform.

BRIEF DESCRIPTION OF THE DRAWINGS

Exemplary embodiments will now be described in conjunction with the drawings, in which.

DETAILED DESCRIPTION

Figure 1:
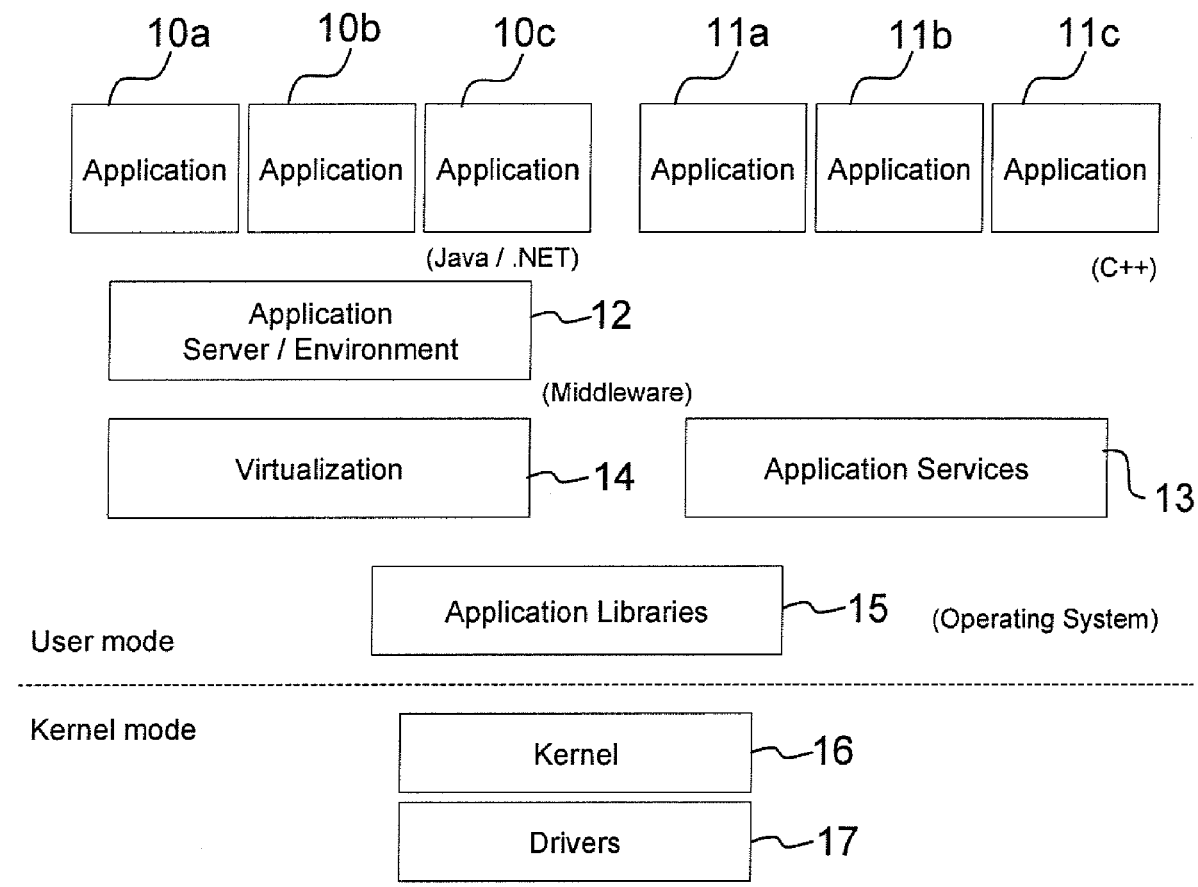
FIG. 1 is a block diagram depicting a basic view of a virtualized software application, using Java/J2EE or NET services, and juxtaposed, is shown a native software application based on C++ services.

The following definitions are used herein:

Computing platform: A computer system with a single instance of a fully functional operating system installed is referred to as a computing platform.

Capsule: An aggregate of files required to successfully execute a set of software applications on a computing platform is referred to as a capsule. A capsule is not a physical capsule but a grouping of associated files, which may be stored in a plurality of different locations that is to be accessible to, and for execution on, a single computer platform or one or more servers. The term "within a capsule" or "encapsulated within a capsule", used within this specification, is to mean "associated with a capsule". A capsule comprises one or more application programs, and associated system files for use in executing the one or more processes; but capsules do not comprise a kernel; each capsule of files has its own execution file associated therewith for starting one or more applications. In operation, each capsule utilizes a kernel resident on the server that is part of the OS the capsule is running under to execute its applications.

Files "within a capsule" are not accessible by application programs executing on the same computer platform in another capsule. Notwithstanding a shared capsule purposefully allows the sharing of specific files.

Secure application capsule: An environment where each application set has individual control of some critical system resources and/or where data within each application set is insulated from effects of other application sets is referred to as a secure application capsule.

System files: System files are files provided within an operating system and which are available to applications as shared libraries and configuration files.

By way of example, Linux Apache uses the following shared libraries, supplied by the OS distribution, which are "system" files.

/usr/lib/libz.so.1
/lib/libssl.so.2
/lib/libcrypto.so.2
/usr/lib/libaprutil.so.0
/usr/lib/libgdbm.so.2
/lib/libdb-4.0.so
/usr/lib/libexpat.so.0
/lib/i686/libm.so.6
/lib/libcrypt.so.1
/lib/libnsl.so.1
/lib/libdl.so.2
/lib/i686/libpthread.so.0
/lib/i686/libc.so.6
/lib/ld-linux.so.2

Apache uses the following configuration files, also provided with the OS distribution:

/etc/hosts
/etc/httpd/conf
/etc/httpd/conf.d
/etc/httpd/logs
/etc/httpd/modules
/etc/httpd/run By way of example, together these shared library files and configuration files form system files provided by the operating system. There may be any number of other files included as system files. Additional files might be included, for example, to support maintenance activities or to start other network services to be associated with a capsule.

One of the difficulties with a cohesive model of software application behavior or execution is that software applications are generally multi-layered and there are multiple facets to dependencies therebetween. One way to view a software application is from the perspective of its place within the computing platform; and, the salient elements of the software application and how the elements interact with the operating system (OS). This architectural view affords a clearer understanding of application requirements and dependencies.

Prior art FIG. 1 illustrates a basic view of two types of software applications. One is a virtualized application, using Java/J2EE or NET services, and the other is a native application based on C++ services. In FIG. 1 applications 10a, 10b and 10c represent Java applications and 11a through 11c represent C++ applications. The applications 11a through 11c can be executed directly by the computer. The execution of the applications requires use of application services 13 and libraries 15 to access hardware services exported through the kernel 16 and drivers 17. Applications 10a through 10c differ in that they consist of byte codes that cannot be executed directly on the computer. Through the use of virtualization 14, the byte codes are converted into instructions that can be executer on the computer. The application server environment 12 provides an extended set of services available for use by 10a, through 10c. All OS services, whether residing in the kernel or in user mode, are shared among all processes hosted by a kernel instance. With reference to FIG. 1, with both Java and C++ application types, processes interact with shared system services through application libraries or interact directly with the kernel in some rare instances. Application processes utilize kernel services to perform operations outside of their process context. This includes access to hardware, communication with other processes hosted by the same kernel, communication outside the platform, allocation of memory; any processes that extend or transcend the given process context passes through the kernel. These kernel services are accessed through system calls.

Figure 1A:
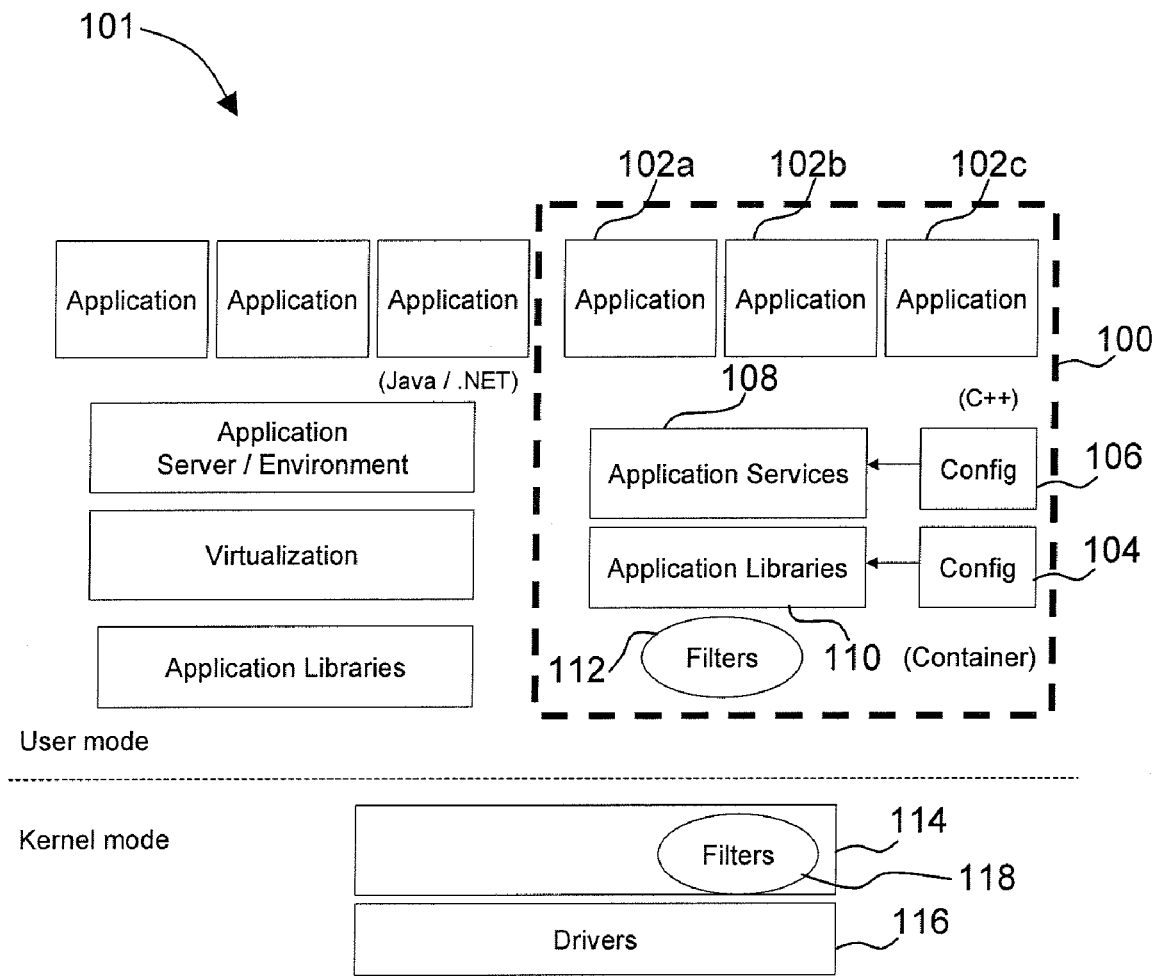
FIG. 1a illustrates the full application model showing the invention alongside an application based on current art.

Turning now to FIG. 1a, an aspect of the invention is shown compared with traditional application models, as used in current art. FIG. 1a is shown divided into two parts, wherein 101 shows applications outside of a capsule environment; and, 100 illustrates the execution of one or more applications within a capsule environment. It can be seen that application binary files 102a, 102b and 102c, make use of application libraries as shown in 110 and application services, 108. Included in a capsule environment are system configuration, 106, and application configuration, 104. Capsule runtime services support system service filters both in user mode as shown in 112, within the capsule environment, and in kernel mode as a kernel module, as shown in 118.

FIG. 1a presents a process view of an application capsule operation. The one or more applications, 102a, 102b and 102c, utilize application services, 108 and access operating system services through the use of application libraries, 110. Applications executing within 100, a capsule environment, utilize system service filters, shown in 112. The system service filters of 112 are not applied to applications executing outside a capsule environment such as those depicted in 100. System service filters applied to applications in 101 allow processes to be tracked within a capsule, as well as allowing application information to be monitored and modified when required.

The invention allows for the provision of a series of application capsules, wherein more than one type of capsule may be required due varying isolation requirements between application types. In a desktop application isolation may be limited to a segregated file name space. A sever based application may benefit by using a completely distinct identity with respect to the underlying OS and other applications. In this instance a series of application capsules are provided. In accordance with this invention the term capsule continuum is used hereafter to describe multiple types of application capsules.

Application isolation is provided in accordance with two factors:

1) Capsule file set content; the files placed in a local capsule file name space define which files will be used local to the capsule. The files located in a capsule file set are used by application processes executing in a capsule environment instead of files located in the underlying OS.

2) System service filters; By defining which system services are filtered and the specific behavior or function of the filter the degree to which the application is isolated from the OS and other applications is controlled.

The two factors governing isolation can be viewed as controls that can be adjusted independent of each other to control the degree of isolation applied to an application capsule. A capsule continuum is created as multiple types of capsules are created. In one embodiment of the invention three capsule types are supported. These are basic, advanced and virtualized capsules. These capsule types represent a specific instance of application isolation. In analogous form they represent a given setting of the two adjustable controls.

While FIG. 1 illustrates how processes within an application 11a, 11b and 11c interact with the broader system 15, 16 and 17 and with each other it does not illustrate the management of their state. At all levels of an application stack, configuration is generally required. At higher levels of the application stack the configuration tends to be static or predetermined, originating from files. Even in instances where scripts or applets are run to configure specific elements, related services most often acquire their input from configuration files. In some instances, configuration is dynamic wherein a user must interactively provide information in order for the application to proceed. The lower levels of the application stack often require both static and dynamic configuration. Parameters specific to the OS, network or other facets of the underlying platform and infrastructure are often times dynamic. Elements that an application will obtain dynamically include an IP address, hostname, MAC address, system ID, and more.

Figure 2:
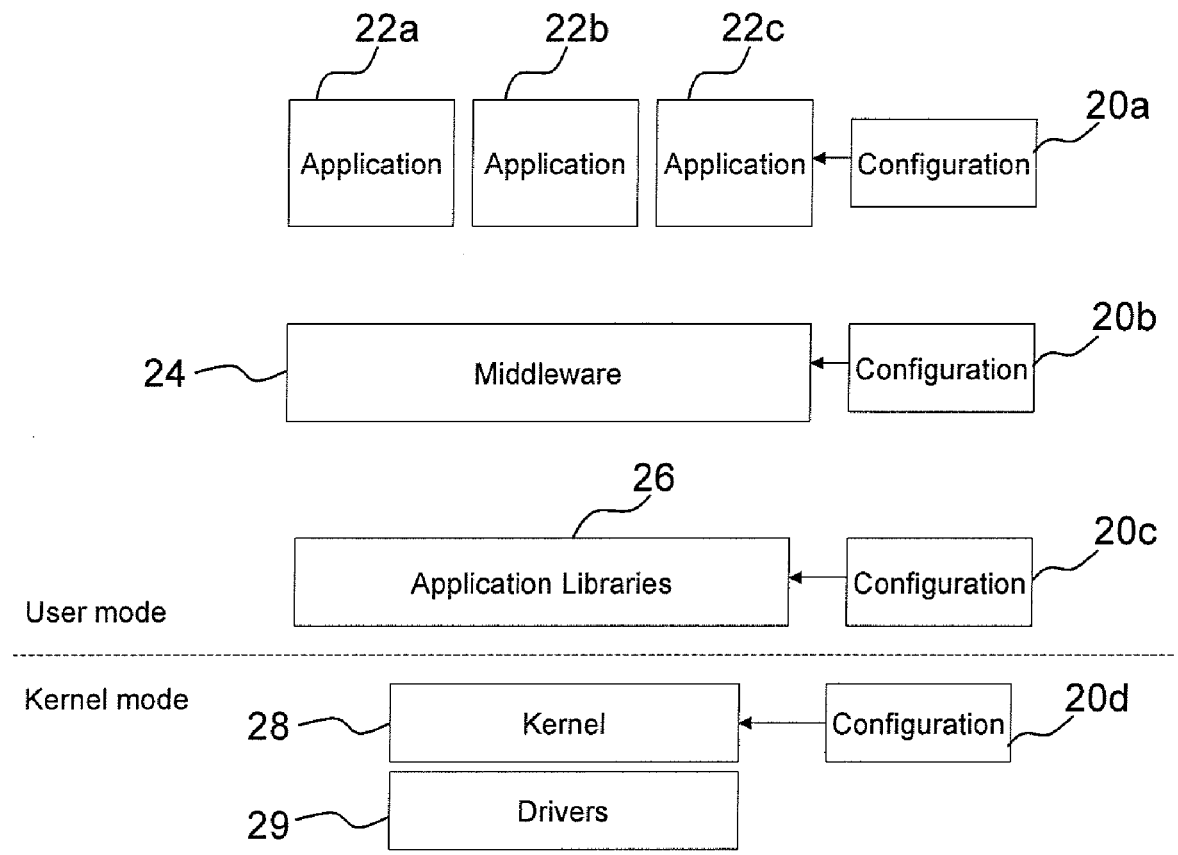
FIG. 2 is a prior art schematic diagram extending the application model to include application state.

FIG. 2 extends the application model to include configuration elements 20a, 20b, 20c and 20d. Configuration elements are applied to the application stack at all levels, creating state dependencies. The applications 22a, 22b and 22c are shown using extended services described as middleware 24. OS services are exported through the use of application libraries 26. These libraries 26 support access to kernel services 28. The kernel controls access to drivers 29. Configuration is applied to the software stack at all levels. Applications 22a, 22b and 22c receive configuration in the form of user defined values as shown in 20a. Middleware configuration is applied in 20b. Application library configuration is applied in 20c. The kernel is configured as shown in 20d.

Software applications provided with an OS distribution are dependent on system services. These system services may take the form of low-level libraries or for example a service may be the loader that places images in memory and manages shared libraries or DLLs. These services may include helper applications, scripts and/or language environments. Where network services are required in conjunction with an application, more often with server applications, a number of processes external to the application itself may be required to support capabilities like RPCs, network mount points, remote management and so forth. By way of example, where local user interaction with an application is utilized the UNIX environment may be required. This often includes an SSH or Telnet service, a shell and most of the UNIX command set.

Figure 3:
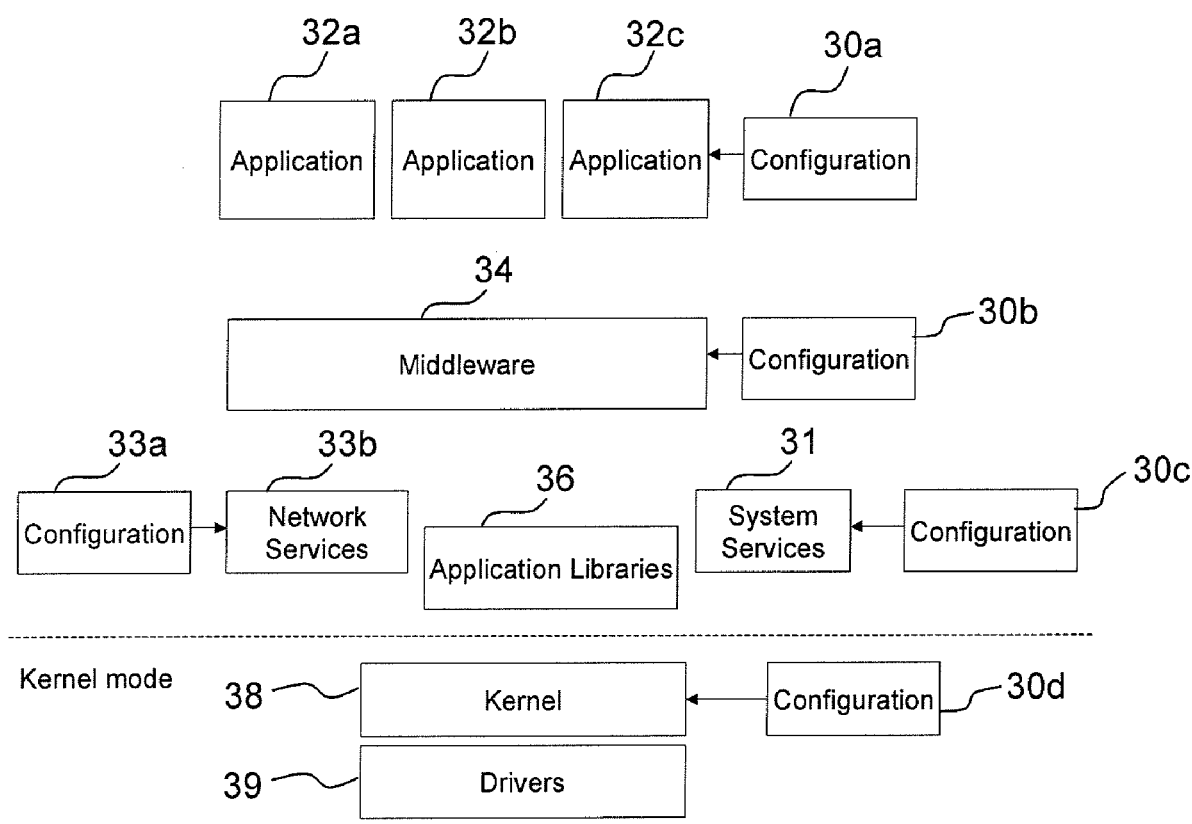
FIG. 3 is a prior art schematic diagram extending the application model to show how system services interact with applications.

FIG. 3 expands the application model to include dependencies on system services 33b and 31a. Applications 32a, 32b and 32c are C++ applications they utilize middleware services 34. Access to OS services is provided by application libraries 36. The kernel 38 controls access to hardware services including all drivers 39. Configuration is applied to the software stack as shown in 30a, 30b, 30c, 30d and 33a. Extended OS services consist of network services 33b and system services 31a. Network services 33b are exemplified by capabilities such as RPC services. System services 31a include capabilities such as logging.

In accordance with this invention, in some instances, mostly with server applications, it may be useful for the application capsule to include network services 53b, unique from the underlying OS. That is, services that execute in the context of the capsule, independent of like services that may or may not execute outside a capsule context, in the underlying OS, or in another capsule. This can result, for example, in a capsule environment hosting its own instance of a port map service. Many applications only require low-level system services. A compiler, for example, may only require a loader and the file system. Such an application is not dependent on external processes as system, services.

System services, where required, are readily started in the context of a capsule. In one embodiment of the invention system services are started in a capsule context by starting a first process in the capsule context that is a script which in turn starts other system services contained within the capsule. This has the effect of starting the first script and any child processes, including system services, in the capsule context.

In accordance with this invention, application capsules provide independence from the underlying infrastructure by allowing both static and dynamic elements of an application state, to be kept local to the application. Local state is accomplished through two means: file encapsulation and system service filters.

Figure 10:
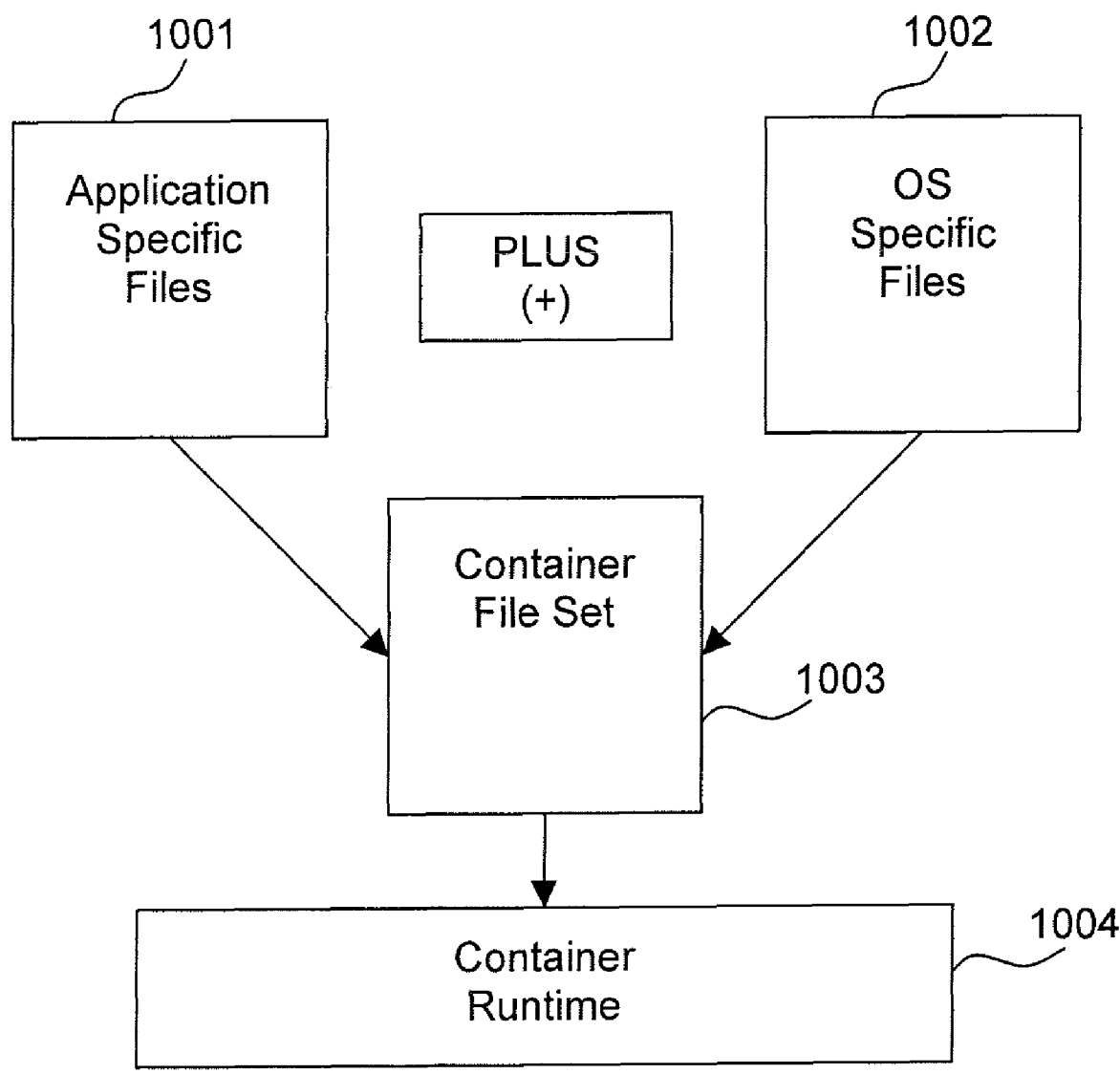
FIG. 10 shows that a capsule file set is comprised of files specific to or delivered with an application in addition to files that are specific to or delivered with an OS.

Files used by the application are encapsulated and made available to processes that are part of the application independent of the files supplied by the OS distribution. This creates a capsule file set available to processes that execute in the capsule environment. FIG. 10 illustrates that a capsule file set 1003 includes files specific to the application 1001, or applications that are being encapsulated, and placed in a capsule as well as files that are specific to the underlying OS 1002. Any number of files could be placed in a capsule file set 1003. Depending on desired behavior, this could include the majority of files included in an OS distribution or a small set required for specific application execution. Application specific files 1001 are those files delivered with or specific to a given application. OS specific files 1002 are those files that are delivered with or specific to the OS. A subset of these files 1002 are placed in the capsule file set 1003. The capsule runtime 1004 provides access to the capsule file set 1003 as processes execute in a capsule context.

A capsule file set is created through the use of a Capsule Build Tool (CBT). The CBT enables automated discovery of the files used by an application as well as a manual file dispatch capability. This is accomplished by running a test instance of the software application and monitoring, tracking and recording all occurrences of files requested in the execution of the application. Any file can be dispatched as follows:

Include. The file is included in the capsule file set. As such it will be used by processes executing in the capsule environment rather than referencing the underlying OS for the file.

Exclude. The file is not used. If a process executing in the capsule environment references the file, it will not be found, even if the file is present in the underlying OS.

Share. The file will be found in a shared capsule. This represents a capsule file set that can be shared among multiple capsules.

Figure 4:
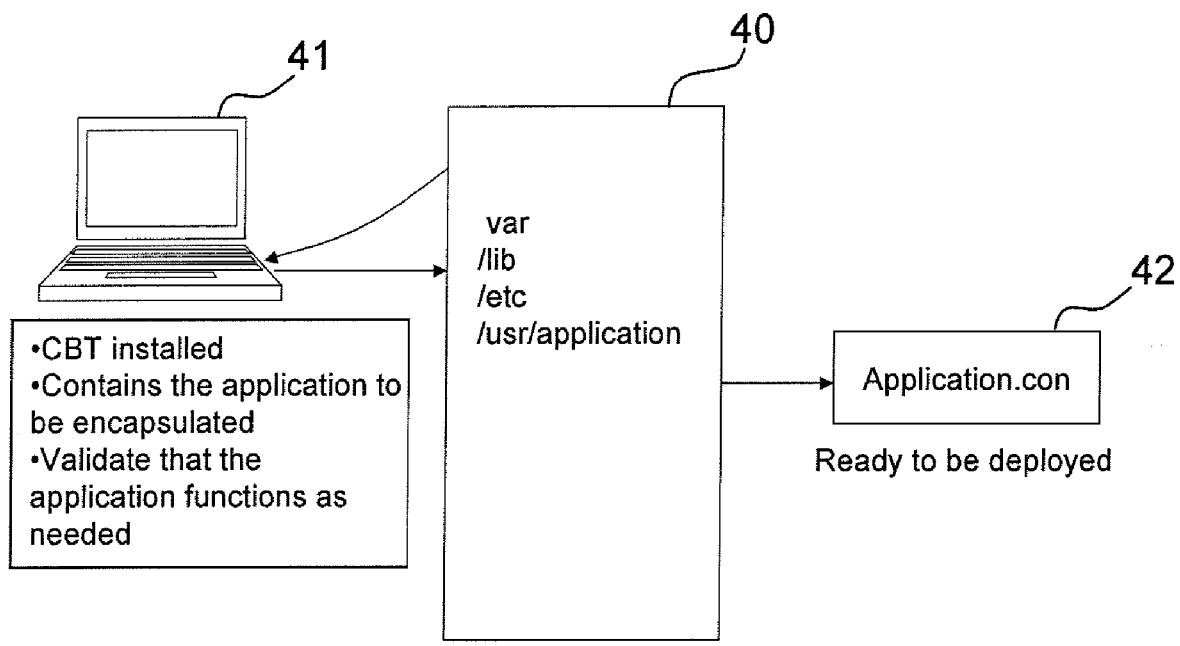
FIG. 4 is a diagram illustrating the basic capsule creation model.

Mount. The file will be found through a mount point defined in the underlying OS.

a) FIG. 4 illustrates how the CBT interacts with a computer platform 41 to discover and dispatch a capsule file set 40. The creation tool CBT is installed on a source platform 41 that includes an application to be placed in a capsule. The capsule creation process performed on 41 results in the creation of a capsule file set 40. Once completed and validated the capsule file set 40 is archived in a single capsule file 42 that is preferably encrypted and compressed.

Capsule runtime (CR) software is fundamental to the operation of application capsules and is installed on a platform that will host a capsule. System service filters, deployed with the CR software 1004, are fundamental to ensuring that applications executing in a capsule context use the appropriate files from the capsule file set 1003. The CR software 1004 is used to manage dynamic application state. It does this by filtering system services. There are three types of system service filters:

a) Process tracking. All processes are identified as being associated with a given capsule or with the underlying OS.

b) Information. Resources used by all processes within a capsule environment are tracked and made available. In addition, application behavior, based on known profiles, can be tracked and any variance reported.

c) Managed state. Certain values returned by system services can be modified such that application isolation is maintained. This includes ensuring that processes executing in a capsule environment use files based on the associated capsule file set. This type of filter will also include operations that ensure capsule identity, such as a unique IP address and hostname.

System service filters are used in both kernel mode and user mode. In kernel mode the system service filters are embodied in a loadable kernel module. When the kernel module is loaded the initialization procedure locates the kernel system call table. A specific system service filter is installed by placing a handler in the corresponding system call table entry. The original system call handler is saved for use by the system service filter. When the specific system call in question is executed in the kernel the system service filter handler is called before the original kernel system call handler.

In user mode the system service filters are embodied in a shared library. The shared library is loaded along with the software application executable objects. The system service filter is executed before the original system service. This type of filtering of a system service in user mode is accomplished using a number of well known capabilities. These include, but are not limited to, library preload services, system call trace facilities, and an upcall mechanism. Library preload and system call trace services are offered as standard features in many operating systems, including most UNIX variants. An upcall mechanism allows a kernel resident function to return to a specific location in user mode. This is similar to the operation performed wherein a signal handler is invoked on return from a system call in a Unix system.

Using system service filters there are two capabilities that are essential to enabling a software application intended to execute on one platform (hardware, OS and kernel) to execute on a different, potentially incompatible platform. These are file mapping and control of the identity supplied by the computer platform to the application. File mapping involves ensuring that a process executing in the context of a capsule uses files effectively from one of three sources:

1) the capsule file set 2) the underlying OS 3) another capsule Identity control involves managing the values returned by the OS to an application that define values including, but not limited to: hostname, IP address, MAC address, system ID, CPU ID.

In one embodiment of the invention file mapping is accomplished by using system service filters with all services that manipulate path names. These include, by way of example, but are not limited to, open, create, stat, fstat, lstat. In this instance, the system service filter determines where the defined file is to be located. It subsequently may use a modified path name to open the file. If a different path name is used to access any given file, this is transparent to the software application. The system service filter searches the three general locations, current capsule file set, OS or other capsules to locate each file. The first file located in a predetermined search order is the one used by the application. In one embodiment of the invention policy, in the form of user interaction from a command line, is used to control the search order.

In one embodiment of the invention, platform identity is managed through the use of system service filters. System services that return platform identity values that are managed through system service filters include, but are not limited to, uname, ioctl, gethostname. The system service filter modifies one or more values returned by the OS to reflect capsule values rather than OS defined values. For example, the system service uname returns a number of values from the OS that include platform identity. An example of values returned in a given Linux OS for the uname service include: system name, node name, release, version, machine. The system service filter for uname would modify the value returned for system name from that defined by the OS to a capsule specific value.

Figure 5:
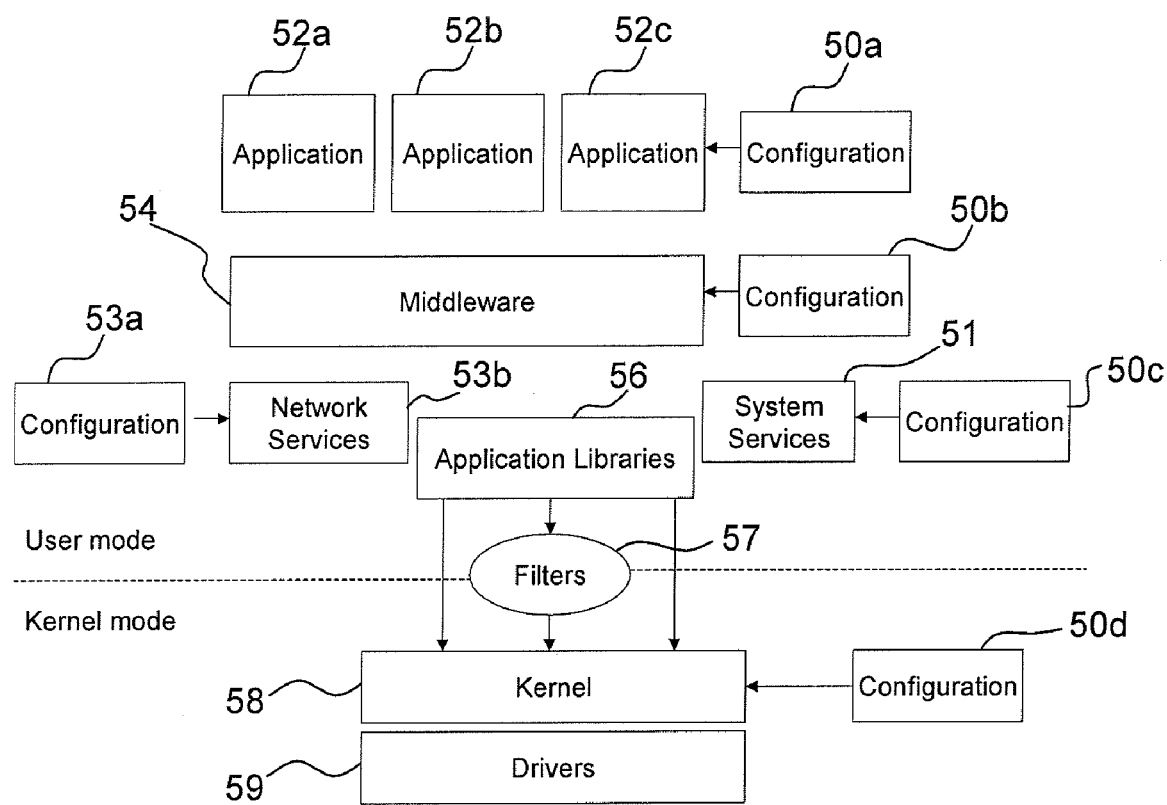
FIG. 5 is a diagram illustrating system service filters in the context of an overall application model.

Referring now to FIG. 5, applications 52a, 52b, and 52c are C++ applications. They utilize middleware extended services as middleware 54. OS services are exported through application libraries 56. Application libraries 56 provide access to the kernel 58. The kernel 58 controls hardware capabilities including drivers 59. The software stack is configured as shown in 50a, 50b, 50c, 50d and 53a. Access to system services can be managed by system service filters as shown in 57.

FIG. 5 illustrates that filtered system services 57 are a subset of those calls or requests 56 made to the kernel 58. The physical filters 57 are implemented in both user mode and kernel mode. A simple kernel module is installed to enable kernel mode services. Because filters 57 are entirely contained at not only a low-level in the application stack 56, but operate on well known interfaces, they have minimal dependency on how any given application 53a, 52b and 52c behaves. That is, well designed filters work for virtually any application.

Figure 9:
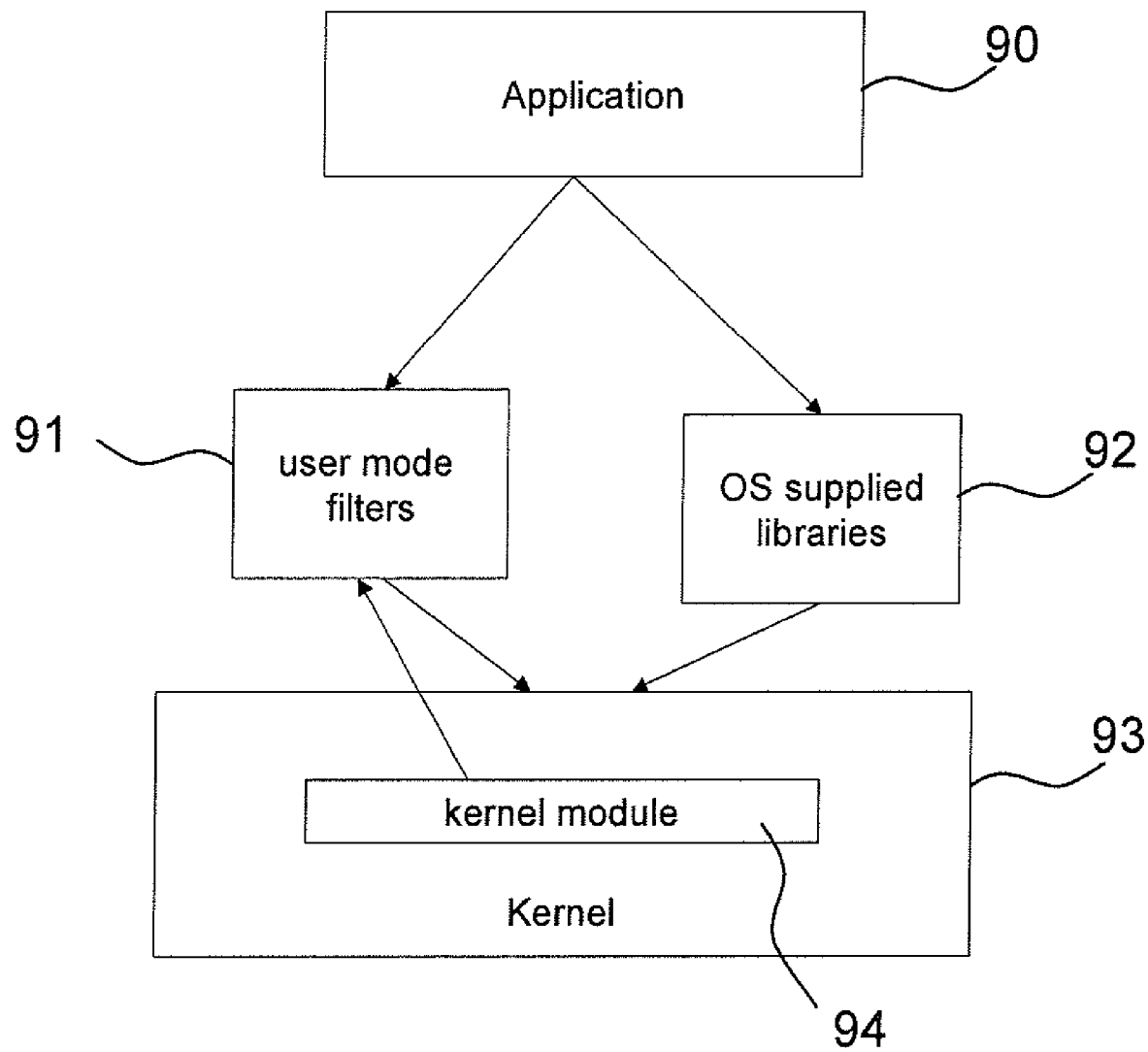
FIG. 9 illustrates the system services filter model.

An effective system service filter design has minimal impact on the way in which the software application executes. Based on this, an application in its native form operates in essentially the same way as it does from within a capsule environment. This capability, combined with encapsulation of any files needed by an application, defines an application capsule. With this capability virtually any application can be placed in an application capsule and made substantially independent of the underlying infrastructure. FIG. 9 illustrates a system service filter 91. It can be seen that any given system service can be filtered from within user mode 91 or kernel mode 94. An upcall mechanism ensures that system services are directed to the filter in user mode when needed. System service filters shared by all capsules are resident in the kernel module 94. The application 90 uses OS services through the use OS supplied application libraries 92. The kernel 93 controls the hardware. System services are embodied in user mode 91 and kernel mode 94. An additional application library 91 is utilized along with application libraries supplied by the OS 92. The additional application library 91 embodies user mode system service filters. A kernel module 94 is used in kernel mode. The kernel module 94 embodies kernel mode system service filters.

The common dependency for applications in a capsule is the kernel itself. This is due to the fact that an application executing within a capsule environment is able to access its own copy of any given file: executable files, library files, and configuration files. This means that any system calls made by application libraries (or embedded in application executables themselves) must be compatible with the underlying kernel on the platform used to host the capsule. Backward compatibility of system calls is normally supported by OS distributions. This allows a capsule from one version of an OS to be placed on a platform with a newer version of the same OS.

A number of variations are possible. One, in particular, will clarify usage of various OS versions. By way of example a software application configured to operate on Solaris 8 can be placed, through an application capsule, on Solaris 10 without modification of the application itself. It should be understood that a software application within a capsule environment does not need to use files distributed with the underlying OS. A properly configured capsule file set for the Solaris 8 application will result in the application using the same files it would use on its original (Solaris 8) platform. The application can be made independent of changes in configuration, file location, and content in Solaris 10.

An example illustrating a Solaris 8 application that lists directory contents running on a Solaris 10 platform is provided. A Solaris 8 "ls" program uses the libraries libc.so.1 and libm.so.1 and requires the executables /usr/bin/ls and /usr/lib/ld.so. It will access the file /var/ld/ld.config during library initialization. A capsule file set is configured to include at least the Solaris 8 files /lib/libc.so.1, /lib/libc/libm.so.1, /usr/bin/ls, /usr/lib/ld.so and /var/ld/ld.config. System service filters are installed for at least open, lstat, fstat and xstat on the Solaris 10 platform. The capsule file set is located in /usr/local/capsules/test on the Solaris 10 platform. From the Solaris 10 platform the Solaris 8 "ls" application is started as a first process in a capsule as defined above. As the Solaris 8 "ls" application executes and accesses the file /lib/libc.so.1 the system service filter for "open" causes the file /usr/local/capsules/test/lib/libc.so.1 to be opened through modification of the pathname. This ensures that the correct file, the Solaris 8 version of libc, is used by the "ls" application instead of the incompatible Solaris 10 library from the file /lib/libc. The same principal is applied to applications that require control of platform identity.

Furthermore, where there have been any customizations made to a Solaris 8 installation: additional folders added, locations altered, or file content modified; these changes can be imported and made available to the Solaris 8 application through the application capsule hosted on a Solaris 10 platform. This is simply an artifact of the application capsule ensuring that application state is kept local to the application, independent of the underlying infrastructure and other applications. In this example part of the underlying infrastructure is a Solaris 10 platform. The same principle and operation holds for movement among Linux platforms and so forth. The Solaris 8 to 10 example is particularly interesting in that both the capsule technology, and as a result the Solaris 8 application, can take advantage of zones and other features exported by the new OS release. A Zone is a feature provided by Sun Microsystems available in Solaris 10 that allows multiple operating system environments in a single Solaris 10 platform.

Fundamentally, an application capsule allows the application to be managed as a service. Thus, any application can be managed as a service. The application handled as a service can therefore easily be moved between computer platforms as well as updated independently of the OS or any other application. The service, as a capsule application, is deployed and maintained as a distinct entity.

Special handling is required to start the first application such that it is contained by way of being associated with a capsule. Subsequent applications and processes created, as a result of the first application, will be automatically associated with the capsule. The automatic association is done through tracking mechanisms based on system service filters. For example, fork, exit and wait system calls are filtered such that capsule association can be applied to one or more applications.

In a preferred embodiment of this invention a capsule or encapsulated file set has a physical presence prior to being installed on a compute platform. It is preferably embodied in a single file. The capsule file can reside on any storage medium as deemed necessary. The configuration state is organized in a properties file. The capsule properties file is resident within the capsule file. A capsule then includes the files used by applications associated with the capsule and configuration and state information. Configuration information includes those values which describe the capsule.

Figure 6:
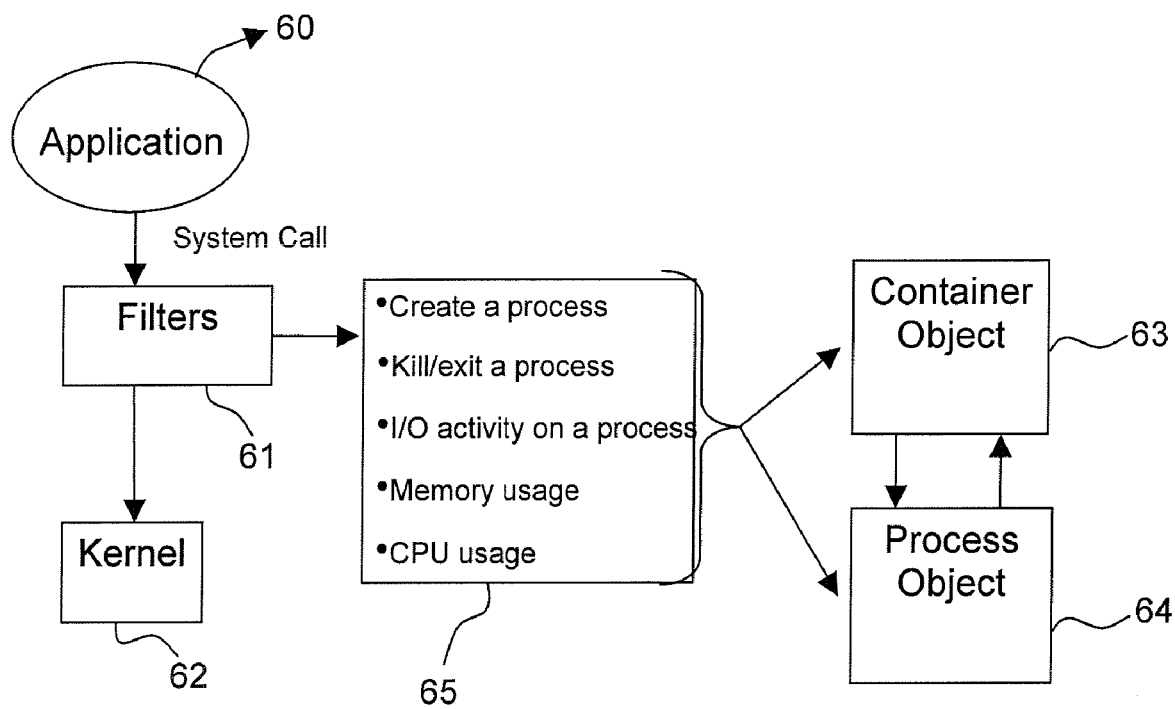
FIG. 6 is a diagram that illustrates the behavior of one aspect of system service filters.

As the software application associated with or contained in a capsule is executed it is monitored through the use of system service filters. Turning now to FIG. 6, the application 60 is shown making a system call. The system service filter 61 filters the system call before original kernel services 62 are accessed. The system service filter 61 is shown monitoring process creation, I/O activity, memory usage and CPU usage 65. Data objects are utilized to manage the required data. A capsule data object 63 tracks all capsules in use. A process data object 64 is used to define which processes are associated with a capsule. It is shown in FIG. 6 that several operations are monitored 65. State information relative to application behavior is stored in data structures 63, 64 and managed by the system services filter capabilities 61. The information gathered in this manner is used to track which processes are associated with a capsule, their aggregate hardware resource usage and to control specific values returned to the software application. Hardware resource usage includes CPU time, memory, file activity and network bandwidth 65.

Also monitored, as described above, is functionality associated with a given application profile. For example, applications of the type Internet browser will have to function in certain ways, creating an operation profile. The capsule-runtime (CR) software, using system service filters, is able to monitor processes executing in a capsule environment according to an application profile. The CR software will report variances that an application performs relative to a profile.

Once a set of files that are retrieved for creating a capsule, for example system files only or system and application files; a subset of the system files are modified. The changes made to this subset may be quite diverse. Some examples of these changes are:

modifying the contents of a file to add a capsule specific IP address;

modifying the contents of a directory to define start scripts that should be executed;

modifying the contents of a file to define which mount points will relate to a capsule;

removing certain hardware specific files that are not relevant in the capsule context, etc., dependent upon requirements.

Figure 7:
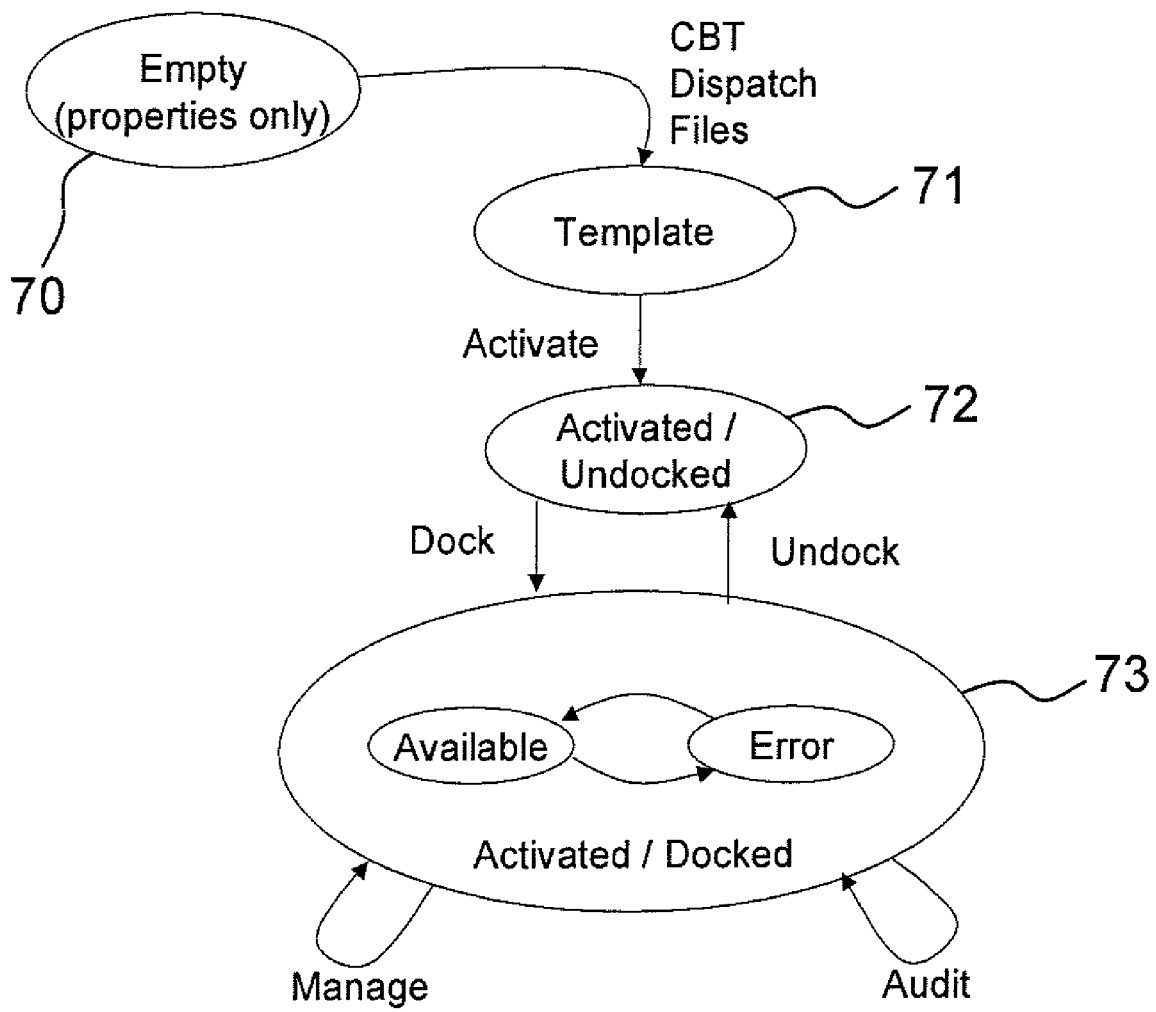
FIG. 7 is a capsule state diagram. It describes the sequencing through out a capsule life cycle.

Capsule operation can be seen through a state diagram. FIG. 7 describes capsule state behavior in relation to events & commands and the action they create. An empty capsule 70 consists of capsule properties including, but not limited to, capsule name and capsule identifier. During the capsule creation process files are added to the capsule. These files can be used in a template state 71. A capsule in template state 71 is used for validation purposes. When the capsule is validated it is activated 72. The capsule files are archived and placed in a single file that is encrypted and compressed. The activated capsule 72 is ready to be deployed, but is described as undocked. Deploying a capsule is accomplished with a dock procedure. A docked capsule 73 is activated. This includes decrypting and uncompressing the capsule file. The capsule files are placed in a directory that is part of the platform OS.

Figure 8:
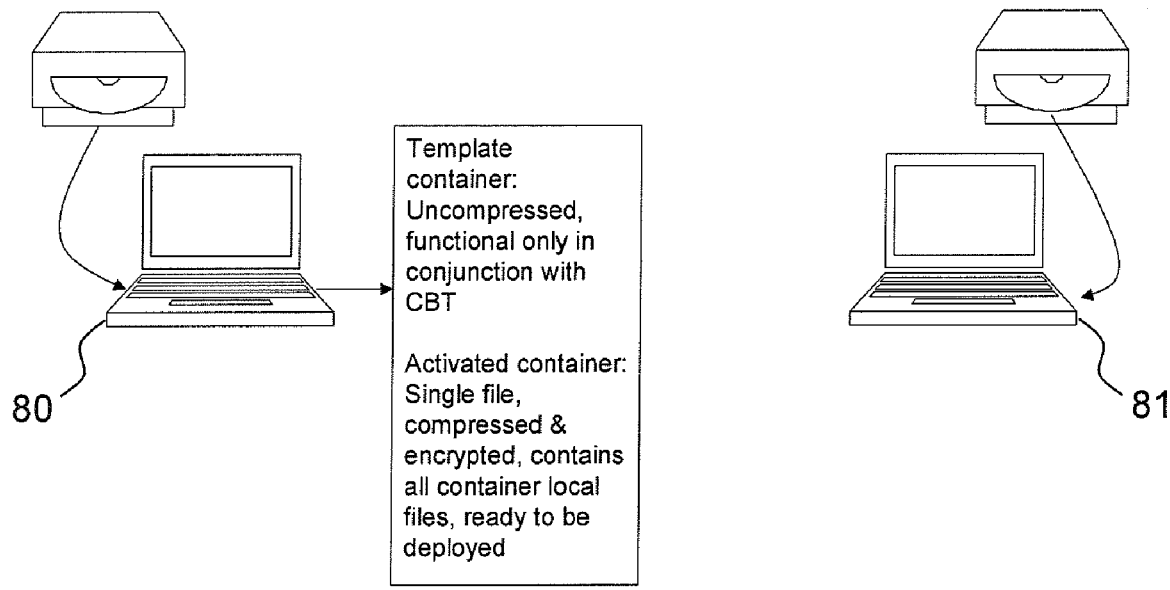
FIG. 8 illustrates the steps taken to create & deploy a capsule.

The creation and use of a capsule are summarized in the following steps. These steps refer to FIG. 8, wherein a source platform 80 embodies an application that is to be placed in a capsule. The creation tool CBT is installed on the source platform 80. A runtime platform 81 is used to host applications in capsules. A capsule runtime CR is installed on the runtime platform 81.

The steps are:

Install CR on a platform 81 that will host one or more capsules;

Install CBT on a platform 80 that has the software application to be placed in a capsule;

Using CBT define general capsule parameters; type, name, description, etc.

Through CBT define files to be included in the capsule, that is, those files that will be accessed in the underlying OS and any shared files;

Through CBT define capsule behavior parameters; start/stop scripts, auto dock, identity of a virtualized capsule, etc.;

CBT outputs a capsule in template state (and a properties file); wherein in template state the capsule file set is expanded and are unpacked and available for use by applications or processes so as to allow processes and applications to be validated.

Using the capsule in a template state on the same platform 80 as CBT is installed, verify that the application functions as expected;

Use CBT to modify files & parameters as needed until the capsule is functional;

Using CBT, activate the capsule. Define Digital Rights Management (DRM) details; which CR(s) can this capsule be docked with;

CBT outputs an activated capsule in a single file;

Copy or move the activated capsule file as required; network file storage, local disk of a CR platform 81;

Ensure that the platform 81 that will host the capsule can access the capsule files (copy or mount points);

Using the CR user interface, either a command line or GUI local to the platform where the CR is installed, or a remote management tool using one of SNMP, CIM or SOAP, dock the capsule;

Use the application in the capsule as needed;

Using the CR user interface (as described above) extract statistics for a capsule;

Using the CR user interface extract events associated with a capsule;

An operational event occurs, such as maintenance being required on the computer hardware, and the capsule should be moved to another platform, or placed in off line storage;

Using the CR user interface undock the capsule;

Leave the undocked activated capsule on the platform 81 or copy/move it elsewhere as needed.

Figure 11:
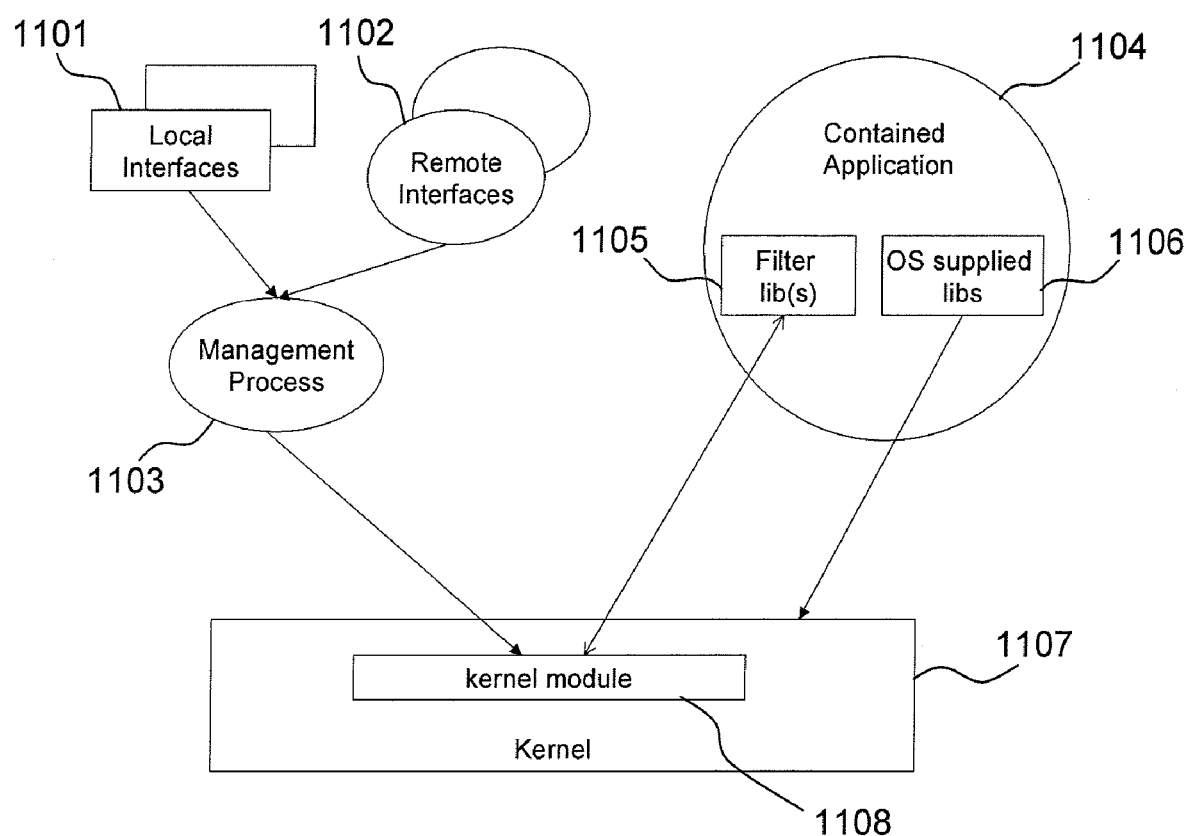
FIG. 11 is a block diagram representing the Capsule Runtime.

FIG. 11 is a block diagram representing the Capsule Runtime. It presents a process view of application capsules 1104 and their interaction with a capsule runtime 1105, 1108. A file oriented view of the application capsule 1303 can be seen from FIG. 13. An application capsule is represented in FIG. 11 as an application 1104 that utilizes one or more OS supplied application libraries 1106. A system services filter capability 1105 is supplied as part of the capsule runtime and is delivered as an application library. Portions of system services filters are performed in kernel mode and are delivered through a kernel module 1108. Both local 1101 and remote 1102 user interfaces are included. A management process 1103 is used to perform event oriented tasks associated with the user interfaces 1101, 1102.

Figure 12:
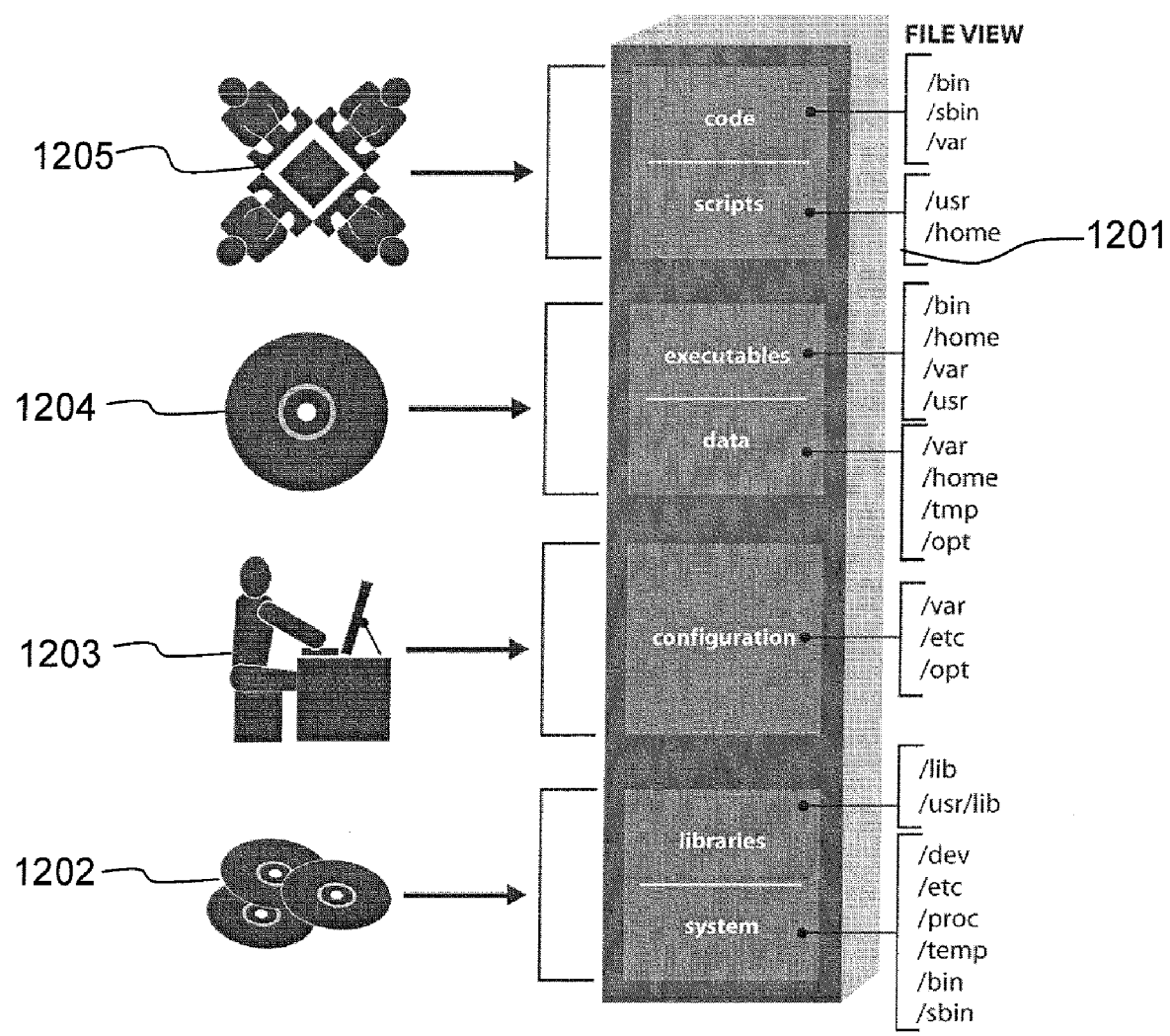
FIG. 12 is a prior art depiction of the anatomy of an software application.

FIG. 12 illustrates the anatomy of an application revealing that an application is a composite of files 1201 on a compute platform distributed as part of an OS 1202. Configuration changes are generally applied to OS 1203 files by IT staff. Application binary files are installed, from commercial media or package files 1204, into the OS defined file system or distribution 1202. The application itself 1204 is then configured to perform a specific service in a given environment. The composite of OS files, application files & configuration files 1201 then make up the application.

Figure 13:
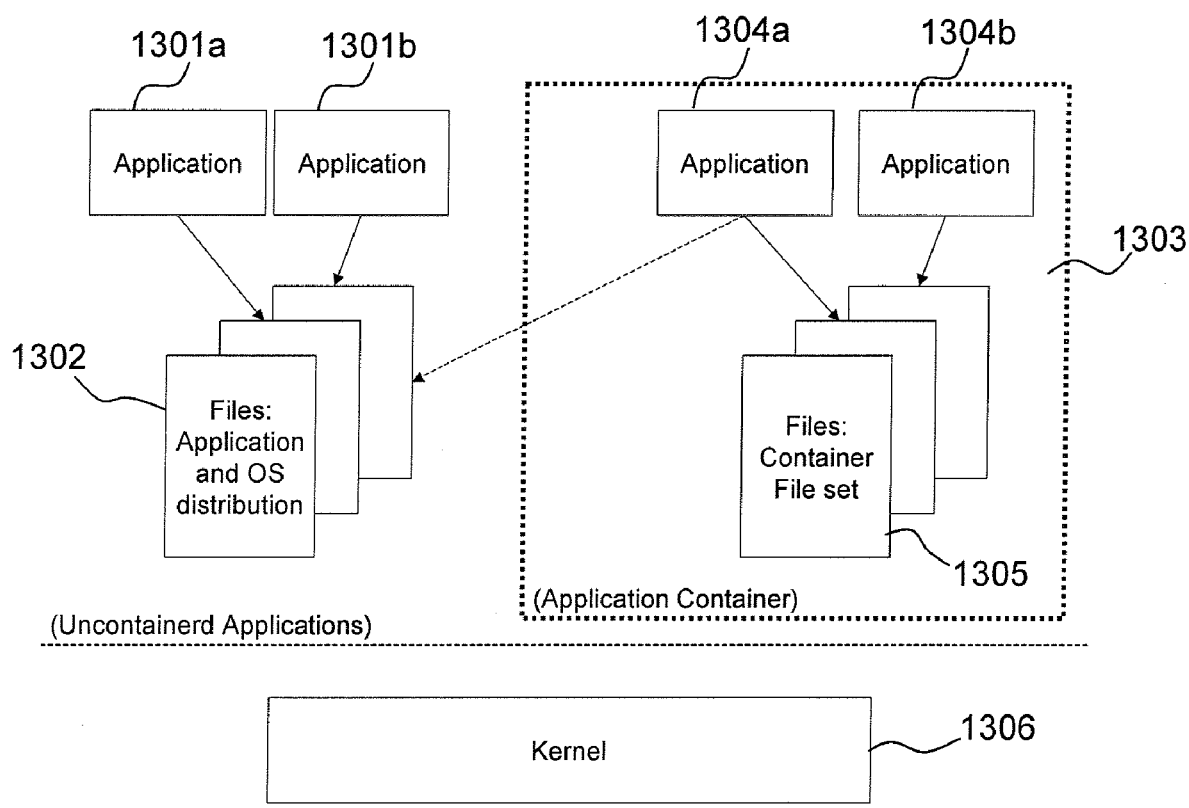
FIG. 13 presents a file oriented view of an application capsule.

FIG. 13 presents a file oriented view of an application capsule 1303 and illustrates that one or more software applications 1304a, 1304b executing in an application capsule environment utilizes a set of files 1305 that are exclusive to the capsule. Applications outside of a capsule environment 1301a, 1301b utilize files as provided with an application and an OS distribution 1302. It is possible, depending on specific capsule configuration elements, to allow applications in a capsule environment 1304a, 1304b to reference specific files from an underlying OS distribution 1302, outside of a capsule context. This is illustrated by the dotted line extending outside the capsule 1303. Applications 1301a and 1301b executing outside a capsule environment 1303 are not able to access files in a capsule file set 1305.

The life-cycle of a capsule and its operation is illustrated through a state diagram as shown in FIG. 7. The capsule creation process, utilizing a capsule build tool, outputs a capsule in template state 71. The capsule in this state is used to validate that the application operates as expected from within the confines of a capsule environment. Once the functionality of the application has been validated, a capsule build tool is used to activate the capsule 72. The procedure to activate a capsule includes:

1. combining all the files in the capsule file set into a single file 72; and
2. describing one or more compute platforms that are able to host the capsule.

In this state the capsule is activated and undocked 72. Applications are deployed through the use of a capsule by docking the capsule on the one or more compute platforms, as defined by activation details 73. The procedure to dock a capsule includes:

1. validation that the capsule can be hosted, as defined by activation details, and
2. placing the files from the single capsule file into the appropriate locations so that they can be delivered to applications within the capsule environment 73.

Any errors detected by applications within the capsule environment will cause capsule state to transition from available to an error condition 73. Local and remote user interfaces support management and audit of a docked capsule 73.

In the previous embodiments described heretofore, the invention has been described in a preferred embodiment wherein containerization or encapsulation of files is required to isolate files.

a) Notwithstanding, less preferable alternative embodiments of this invention also include a system wherein such isolation is not required. In embodiments wherein capsules are not required, system service filters embodied in the at least one application filter library is resident in user mode which is provided in addition to the local operating system libraries reside in user mode. This library is loaded into memory in the same local operating system defined virtual address space as the application associated with a capsule and requesting a system service. System service filters embodied in the application filter library execute in the same local operating system defined process context as the application associated with a capsule and requesting a system service.

b) System service filters embodied in a kernel module are resident in the local operating system defined kernel mode. The kernel module is loaded into memory in the same local operating system defined virtual address space as the kernel. System service filters embodied in the kernel module execute in the local operating system defined kernel context.

What is claimed is:

1. A system for enabling a first software application stored in a computer readable medium, which is designed for execution on a first computer platform having a first operating system stored therein and having a first processor, to be executed on an incompatible computer platform having a second incompatible operating system and having a second memory and a second processor, in which the first software application is not intended to execute, said system for providing a secure isolated capsule environment for execution of the first software application by the second processor on the incompatible computer platform, said first software application including an object executable by a local operating system of the incompatible computer platform for performing a task related to a service, the incompatible computer platform including a local kernel within the second incompatible operating system residing in the second memory on the incompatible computer platform, and a set of associated local system files compatible with the local kernel and the processor of the incompatible computer platform, the system comprising:

a) a set of associated capsule-related files stored in a readable memory, comprising a first group of files that include the first software application, designed to execute on the first computer platform and a second group of files that are distributed with or are specific to an operating system required to execute the first software application, wherein in operation said associated capsule-related system files are used in place of the associated local system files normally used to perform a same task, which reside in the second memory on the incompatible computer platform as part of the operating system, said set of associated capsule-related system files for use by the first software application within the capsule environment; and, b) capsule runtime software for managing a dynamic state and file location of the first software application, the capsule runtime software including a kernel module resident in kernel mode and at least one application filter library resident in user mode for filtering one or more system service requests made by the first software application and for providing values from the at least one application filter library stored in the second memory which is provided in addition to the local operating system libraries to modify values that otherwise would have been returned by the local operating system in the absence of said filtering one or more system service requests from the first software application, wherein execution of the first software application requires access of files from the capsule-related files resident in the second memory on the incompatible computer platform in place of operating system files and wherein capsule specific values are provided instead of values related to an identity of the incompatible computer platform.

2. A system as defined in claim 1, wherein each capsule has an execution file associated therewith for starting one or more applications therewithin.

3. A system as defined in claim 2, wherein the execution file includes instructions related to an order in which executable applications within will be executed.

4. A system as defined in claim 1, wherein the kernel module and the at least one application library provide system-service filters for performing at least one of:
   i) tracking of software applications within the capsule;
   ii) modifying information used by applications in the capsule; and,
   iii) monitoring information used by applications in the capsule;

wherein the system service-filters ensure that the first application within the capsule environment utilize the set of associated capsule-related system files.

5. A system as defined in claim 1 wherein the set of associated capsule related files are provided as a single file comprising the set of files.

6. A system as defined in claim 1 wherein the set of associated capsule-related files are associated with and are contained within a capsule.

7. A system as defined in claim 6 wherein a plurality of capsules are provided.

8. A system as defined in claim 1 wherein the set of associated capsule-related files, comprising the first group of files that include the first software application, the second group of files that are distributed with or are specific to an operating system are combined into a single encapsulated file.

9. A system as defined in claim 1 wherein the associated capsule related files include a filter library for communicating with the kernel module and application binary files which utilize application libraries and application configuration information.

10. A system as defined in claim 9 further comprising a capsule build tool for encapsulating a plurality of said files into a single file.

11. A system as defined in claim 1, wherein some application libraries request services from the kernel directly and wherein some other requests from application libraries filtered by way of being redirected prior to a request made to the kernel.

12. A system as defined in claim 1 wherein the set of associated capsule-related files are limited to a segregated file name space.

13. A system as defined in claim 1, wherein in operation the run-time software manages a dynamic application state filtering system service requests.

14. A system as defined in claim 13, wherein system filters perform at least one of:
   a) tracking processes identified as having an association with a particular capsule, or with the OS;
   b) tracking resources used by processes executing within a capsule; and
   c) modifying values returned by system services for providing isolation of files within a capsule.

15. A system as defined in claim 1, wherein system service filters are used in both kernel mode and user mode, and wherein system service filters associated with a capsule allow processes executing within a capsule to be tracked, information related to the first software application to be monitored and modified.

16. A system for enabling a first software application, which is designed for execution on a first computer platform, to be executed on an incompatible computer platform, having a memory and a processor, in which the software application is not intended to execute, said system comprising:

a first group of computer-readable files stored in a readable memory that are distributed with or are specific to the first software application intended to be executed on the first computer platform and a second group of computer-readable files that are distributed with or are specific to an operating system associated with the first computer platform;

means for isolating the first group of files from other software applications so as to provide an isolated first group of files;

capsule runtime software for managing a dynamic state and file location of the isolated first group of files, the capsule runtime software including a kernel module and at least one application library for modifying the behavior of a local operating system stored in memory on the incompatible computer platform and accessible to the processor of the incompatible computer platform, so that execution of the first software application requires access of the isolated first group of files in place of operating system files and providing capsule specific values instead of values related to an identity of the incompatible computer platform.

17. In a system having a first software application, which is designed for execution on a first computer platform, a method of executing said first software application on an incompatible computer platform in which the first software application is not intended to execute, said first software application including an object executable by a local operating system of the incompatible computer platform for performing a task related to a service, the incompatible computer platform including a processor, an operating system including a local kernel residing on the incompatible computer platform, and a set of associated local system files compatible with the local kernel and the processor of the incompatible computer platform, the method comprising:

a) providing a computer readable set of first files, comprising a first group of files that include the first software application, designed to execute on the first computer platform and a second group of files that are distributed with or are specific to an operating system required to execute the first software application;

b) in the execution of the first software application on the incompatible computer platform using said second group of files in place of the associated local system files normally used to perform a same task, which are resident on the incompatible computer platform as part of the operating system, and, c) executing on the second incompatible computer platform runtime software for managing a dynamic state and file location of the first software application, the runtime software including a kernel module resident in kernel mode and at least one application filter library resident in user mode and filtering one or more system service requests made by the first software application and providing values from the at least one application filter library which is provided in addition to the local operating system libraries to modify values that otherwise would have been returned by the local operating system in the absence of said filtering one or more system service requests from the first software application, and executing the first software application by accessing files from first set of files in place of operating system files and wherein predetermined values are provided instead of values related to an identity of the incompatible computer platform.

18. A method as defined in claim 17, wherein the one application filter library resident in user mode for filtering one or more system service requests is executed in a same process context as a process which requests a service.

19. A method as defined in claim 17 wherein said at least one application filter library resides in a same address space as said first application making a system service request.

20. A method as defined in claim 17, wherein the first set of files is a set of capsule files.

* * * * *